Nov. 15, 1960
W. E. BRANDAU
2,959,920
SPEED AND TEMPERATURE RESPONSIVE FUEL
CONTROL SYSTEM FOR COMBUSTION ENGINES
Filed July 29, 1948
3 Sheets-Sheet 3
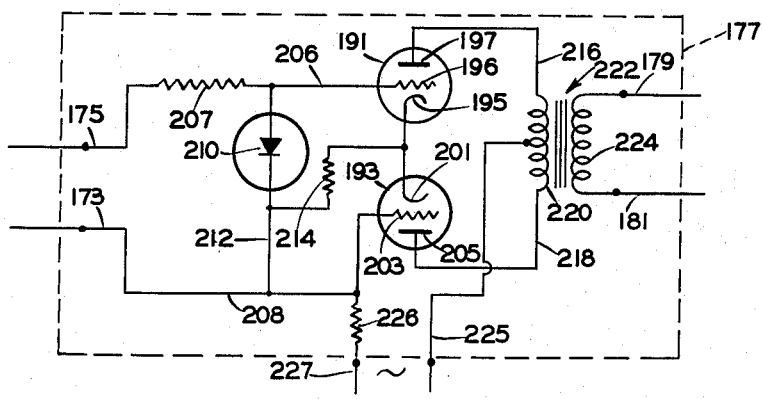
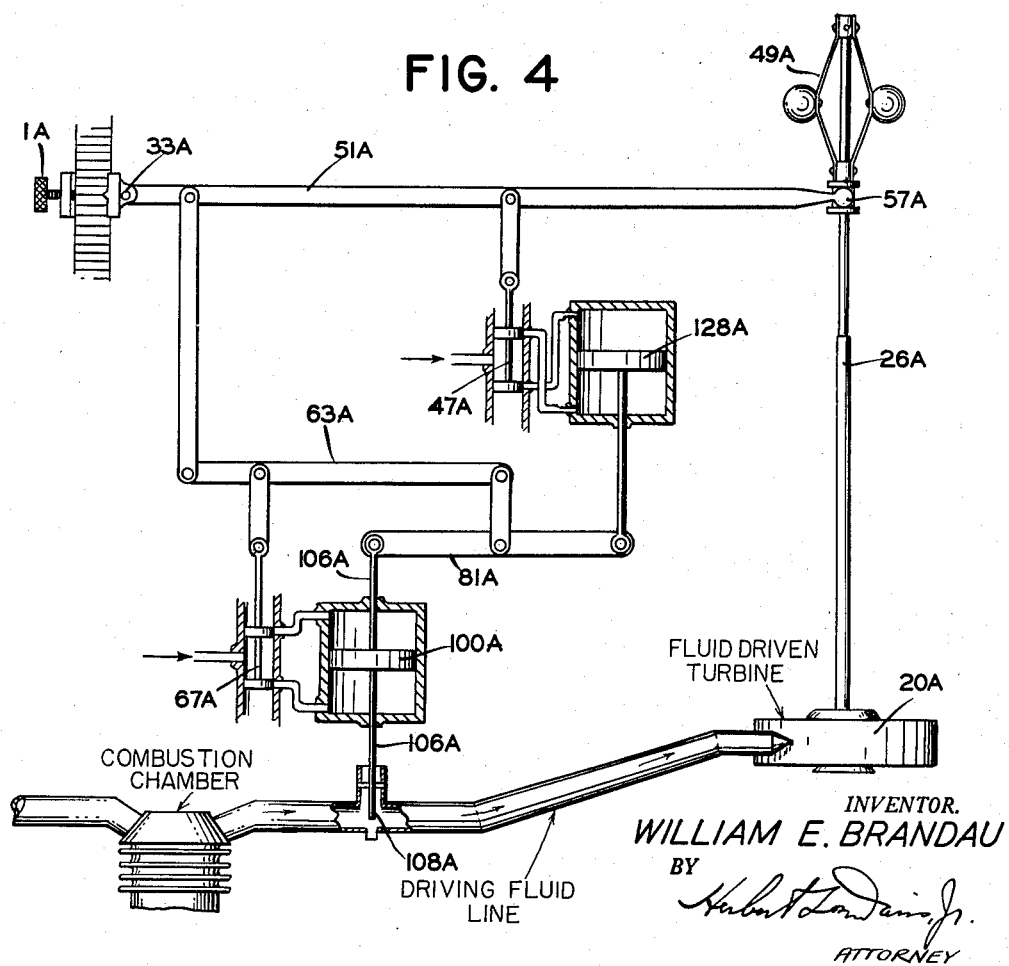
INVENTOR.
WILLIAM E. BRANDAU
BY
*Herbert Laurin Jr.*
ATTORNEY

United States Patent Office 2,959,920
Patented Nov. 15, 1960

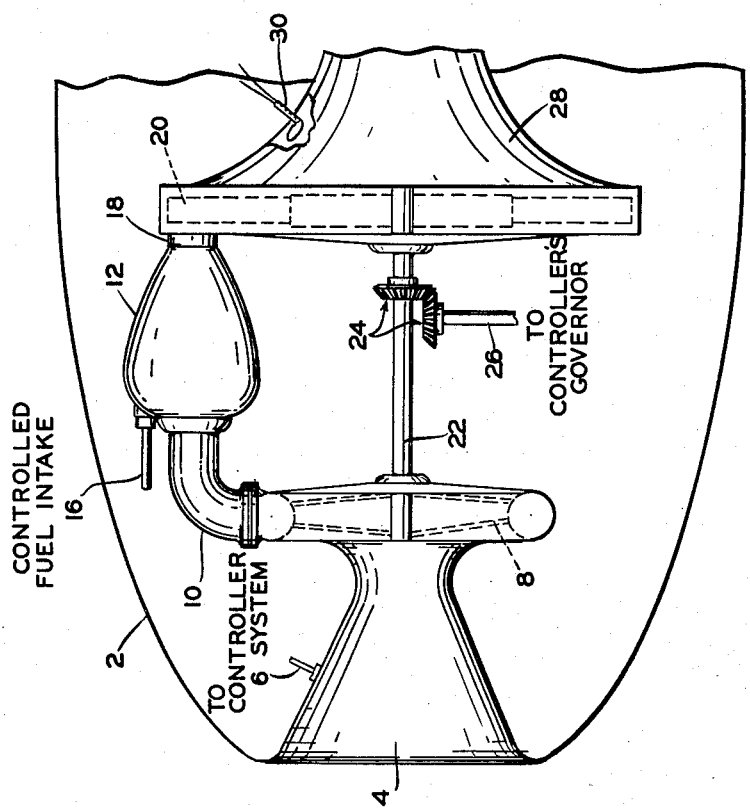

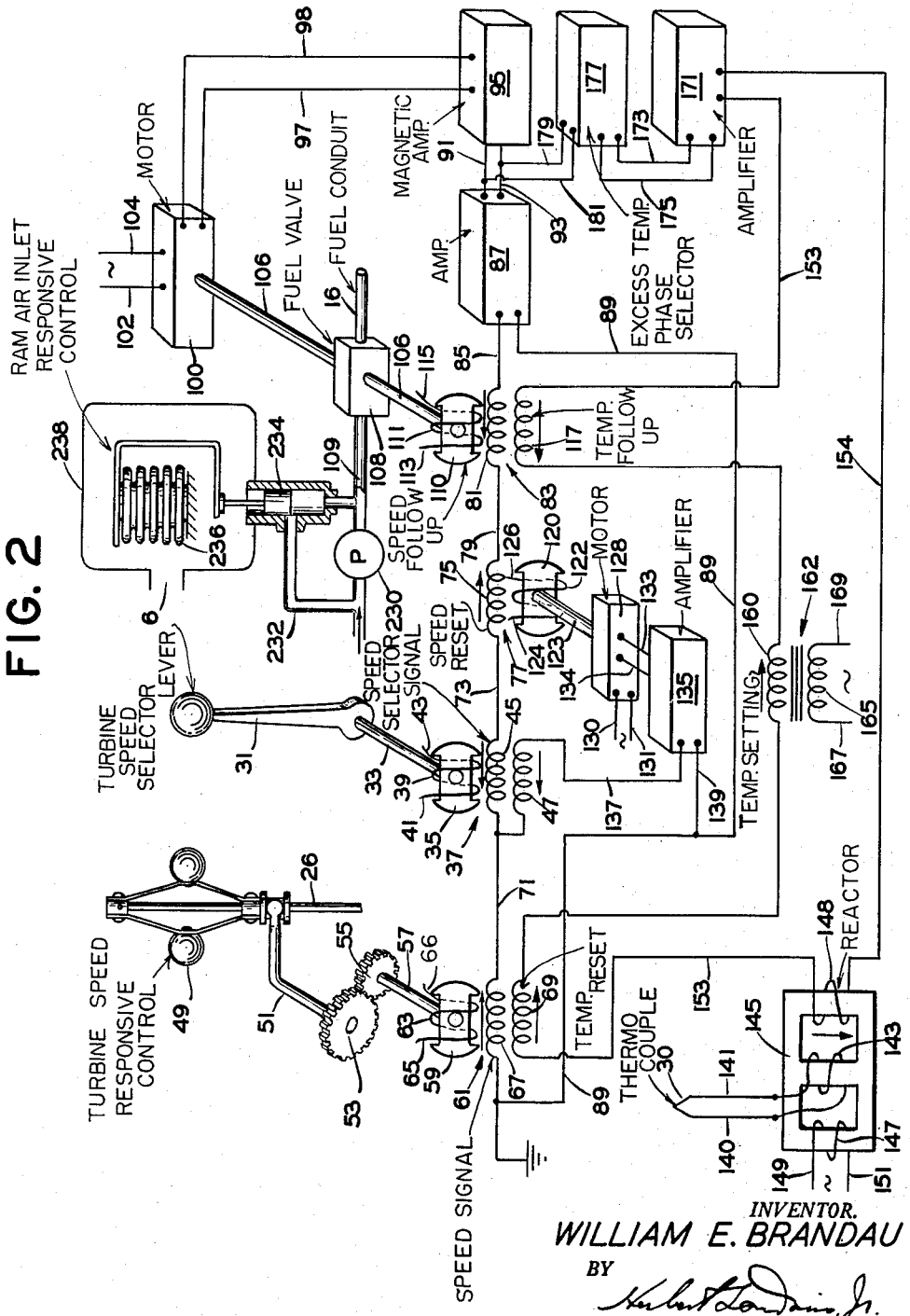

2,959,920

SPEED AND TEMPERATURE RESPONSIVE FUEL CONTROL SYSTEM FOR COMBUSTION ENGINES

William E. Brandau, Westwood, N.J., assignor to The Bendix Corporation, a corporation of Delaware Filed July 29, 1948, Ser. No. 41,329

17 Claims. (Cl. 60—39.28)

The invention relates to a turbojet engine control system of high performance. It particularly relates to critically damped or dead-beat control systems including reset means to eliminate steady state error of control speed upon changes of operating conditions. It relates to improvements in, and specific electrical, electronic and mechanical means for, control systems such as appear in copending application Serial No. 38,314, filed July 12, 1948, now Patent No. 2,746,247, issued to James E. Bevins; copending application Serial No. 40,918, filed July 27, 1948, by William R. Polye and James E. Bevins; and copending application Serial No. 40,937, filed July 27, 1948, now Patent No. 2,694,900, issued to William E. Brandau.

An object of the invention is to provide such a control system or controller having follow-up and reset means together with means for returning the reset means substantially or nearly to a normal or null position, without the follow-up affecting the reset means.

Another object of the invention is to provide such a control system with improved dead-beat reset means to minimize overshooting or undershooting of the controller under sharp transient changes of, e.g., the speed setting. A related object is to provide such a reset means as to enable the engine to most rapidly, yet stably, approach a new set speed following a change in the speed setting.

Yet another object of the invention is to provide an improved means for overriding the normal action of the controller when a predetermined operating temperature is exceeded. An object related thereto is the provision of a follow-up means effective during such overriding periods to then maintain stability of the same degree as during normal control.

And still another object is to provide means for maintaining stability of control over a wide, safe range of engine operating conditions.

The invention broadly involves a unique solution of the problem of obtaining fast yet accurate response of a control system for a turbojet engine while maintaining stability. Follow-up means are used, as is well known, for providing stability at the expense of "droop" or speed error due to the engine's operating conditions. When a conventional reset means is used for removing such error, the reset's integrating action, if reasonably fast, tends to produce instability; while, if the action is slow enough to avoid instability, an objectionably long time-lag occurs while the follow-up's component is being absorbed by the reset—the follow-up and reset being effectively in series in the conventional proportional-plus-reset control system.

Under the invention, however, the conventional, simple series, or complemental, action of follow-up and reset is not followed. Instead, advantage is taken of the different time-lags of response of different parts of the whole system to permit a prompt stabilizing follow-up of the fuel throttling valve (of the order of 1 second, e.g.) to be offset by a substantially opposing effect of the but slightly slower response of the engine speed (of the order of 5 seconds, e.g.). This leaves to a much slower reset (of the order of 60 seconds, e.g.), only the relatively lighter task of trimming the remaining error.

Also under the invention, a semi-logarithmic type of fuel valve is used in which a substantially constant percentage change of fuel flow occurs (for a given differential pressure across the fuel valve) for a given increment of the fuel valve travel anywhere within its operating range.

Under the invention, the pressure upstream of the fuel valve is regulated in substantially constant proportion to the absolute pressure of the air flowing into the engine, by controlling the by-passing of fuel around a constant-displacement fuel pump. For a turbojet engine there is no propeller and hence no change in the load on the engine such as would occur with a turboprop engine when the load is changed. But for a turbojet engine, the mass-rate of airflow into the engine varies directly with the absolute pressure of such air and hence the mass-rate of fuel flow must be kept in proportion to the airflow, which is done by making the differential pressure across the fuel valve proportional to absolute pressure of such air.

This resultant compensation for altitude can be obtained alternatively by increasing the sensitivity of the fuel valve's follow-up means with increase of altitude or decrease of the pressure of the fuel flowing into the combustion chamber. Either of such compensating means is adequate to enable the reset to return substantially to a central position while the fuel valve makes a slight overshoot. However, even this slight overshoot may be eliminated to produce a true dead-beat action, by accepting a slight displacement of the reset means from its precisely central position.

Also under the invention, a temperature-loop having a valve follow-up is added to provide stability during temperature-override periods, along with a speed follow-up or "speed-bias" to eliminate the droop otherwise due to the valve follow-up. The control system thus includes a temperature-loop paralleling a speed-loop which includes a reset sub-loop, an arrangement which provides rapid, accurate and dead-beat control of a turbojet engine when the system's components are suitably sized for the particular engine.

The above and other objects and features of the invention will appear more fully hereinafter from a consideration of the following description taken in connection with the accompanying drawings wherein one embodiment of the invention is illustrated by way of example.

In the drawings:

Figure 1 is a diagrammatic view of a typical turbojet engine showing the takeoffs for its controller.

Figure 2 is a schematic diagram of a turbojet engine controller under the invention, including electronic control means for carrying out certain specified functions.

Figure 3 is a circuit diagram of the phase selector indicated in Figure 2 by the numeral 177.

Figure 4 is a mechanical analogue of the speed control system shown in Figure 2.

*A typical turbojet engine*

Referring to Figure 1, the engine is mounted within a body 2, e.g. the nacelle of an aircraft which moves toward the left, in this figure, so that ambient air is rammed into an intake 4 with a pressure intake 6 therein for connection to the engine control system or controller. This air is compressed by a blower or compressor 8 and flows through a conduit 10 into a combustion chamber 12. Fuel at a controlled rate is fed through a line 16 into the combustion chamber 12.

The products of combustion flow out through a nozzle 18 to a drive turbine wheel 20 which drives the compressor 8 through a shaft 22. Gearing 24 and a shaft 26 connect the turbine shaft 22 with the speed governor of the controller. The turbine exhaust exits through a jet-tube 28 in which is secured a means 30 sensitive to the exhaust gas temperature.

From the standpoint of automatic control, response lags of the engine tend to produce instability which requires either damping or a rate component for neutralization. Main sources of such lags are the inertia of the turbine's rotating parts, the time for combustion of fuel, and the time required for air to pass through the engine. On the other hand, the strong self-regulation of the engine itself strongly assists the controller in maintaining stable control.

Referring to the drawing of Figure 2, there is indicated by the numeral 31 a pilot's control lever operably connected through a shaft 33 to a rotor 35 of an induction transformer or variable inductive coupling means 37. The rotor 35 has a winding 39 connected by leads 41 and 43 across a main source of alternating current having a constant frequency. The rotor winding 39 is inductively coupled to stator windings 45 and 47. The coupling relation between the rotor and stator windings varies with the position of the control lever 31.

Driven by the shaft 26 from the turbine 20 is a fly-ball governor 49 of conventional type and which is mechanically connected through a rotary arm 51, gears 53 and 55, and a shaft 57 to a rotor 59 of a speed responsive induction transformer or variable inductive coupling means 61. The rotor 59 has a winding 63 connected by leads 65 and 66 across the main source of alternating current having a constant frequency. The rotor winding 63 is inductively coupled to stator windings 67 and 69. The coupling relation between the rotor and stator windings varies with the position of the fly-ball governor 49 which is responsive to the speed of the turbine 20.

The stator winding 67 of the speed responsive transformer 61 is connected at one end through a conductor 71 in series with the stator winding 45 of the transformer 37 which is in turn connected through a conductor 73 to a stator winding 75 of a speed reset transformer 77, the purpose of which will be explained hereinafter.

The stator winding 75 is connected by a conductor 79 with a stator winding 81 of a speed follow-up transformer 83 which is in turn connected through a conductor 85 to the input of an amplifier 87. The opposite end of the speed transformer 61 is connected through a conductor 89 to the input of the amplifier 87. The amplifier 87 may be of a conventional type or may be of a type such as shown in the copending application Serial No. 792,885, filed December 20, 1947, by Adolph Warsher, now Patent No. 2,493,605.

It will be seen then that there is provided an input loop circuit to the amplifier 87 which includes the stator winding 67 of the speed responsive transformer 61, stator winding 45 of the speed selector transformer 37, stator winding 75 of the speed reset transformer 77, and stator winding 81 of the speed follow-up transformer 83.

The winding 39 is arranged in relation to windings 45 and 47 so that the voltage induced from winding 39 into windings 45 and 47 will be 180° out of phase with the voltage induced in winding 67 from winding 63. The amplitude of the voltages induced in windings 45 and 47 will be equal and dependent upon the coupling relation between winding 39 and the windings 45 and 47, while the amplitude of the voltage induced in winding 67 will be dependent upon the coupling relation between winding 63 and winding 67 which is in turn dependent upon the speed of the turbine 20 driving the flyball governor 49 through shaft 26.

When the voltage induced in winding 45 equals that induced in winding 67, no differential or signal voltage will be applied across input lines 85 and 89.

However, upon the voltage induced in winding 67 exceeding that induced in winding 45, a signal voltage will be applied across lines 85 and 89 having a phase relation indicating a speed of the engine or turbine 20 in excess of that selected by the position of the transformer rotor 35, while upon the voltage induced in winding 45 exceeding that induced in winding 67 there will be applied to lines 85 and 89 a signal voltage having an opposite phase relation and indicating a speed of the engine or turbine 20 less than that selected by the position of the transformer rotor 35.

Output conductors 91 and 93 lead from the amplifier 87 to a magnetic amplifier 95 of conventional type or of a type such as shown, for example, in the U.S. Patent No. 2,432,036, granted December 2, 1947, to Paul A. Noxon and assigned to Bendix Aviation Corporation.

Output conductors 97 and 98 lead from the magnetic amplifier 95 to the control winding of a two-phase motor 100. The other winding of the motor 100 is connected by conductors 102 and 104 across the main source of alternating current.

The motor 100 adjusts through a shaft 106 a fuel throttling valve 108 which connects fuel conduits 16 and 109 and controls the fuel supplied to the combustion chamber 12 through conduit 16.

Upon the speed of the turbine 20 decreasing below that for which the transformer 37 is set, a signal voltage applied to the amplifier 87 and magnetic amplifier 95 will be impressed across the motor control lines 97 and 98 of such a phase as to cause rotation of the shaft 106 and adjustment of the fuel throttling valve 108 in a direction to increase the supply of fuel to the combustion chamber 12 to in turn increase the speed of the engine of turbine 20 to the selected value. If the speed of the engine increases above that for which the transformer 37 is set, the signal voltage across lines 97 and 98 will have an opposite phase relation causing rotation of the motor 100 in an opposite direction to decrease the fuel supplied throttling valve 108 and thereby decrease the engine speed to the selected value. It will be seen then that the voltage of the speed selector transformer 37 bucks that of the speed transformer 61. The voltage of the transformer 61 calls for less engine speed while the voltage of the transformer 37 calls for an increase in the speed of the engine.

The predominating signal voltage, of course, controls the action of the motor 100 and tends to maintain the speed selected through the transformer 37 by the position of the pilot's control lever 31.

*Speed follow-up*

As shown in Figure 2, the motor 100 in addition to positioning the throttling valve 108 through shaft 106 also positions through shaft 106 a rotor 110 of the speed follow-up transformer 83. The rotor 110 has a rotor winding 111 connected through conductors 113 and 115 to the main source of alternating current. The winding 111 is further inductively coupled to the stator winding 81 and a second stator winding 117 of the transformer 83. The winding 111 is arranged to induce in the winding 81 a voltage which is in phase with the voltage induced in the winding 45 and 180 degrees out of phase with the voltage induced in the winding 67 so as to tend to add to the voltage induced in the winding 45 a follow-up voltage which increases upon adjustment of the rotor 110 by the motor 100 in a valve closing direction decreasing fuel or engine speed and tending to rebalance the differential or signal voltage across the lines 85 and 89 occurring upon an unbalanced relation between the differential transformers 37 and 61. Upon a call for increased fuel or engine speed the rotor 110 is adjusted in an opposite valve opening direction and tending to decrease the additive effect of the follow-up transformer 83 on the transformer 37 and effect a reverse follow-up action. The follow-up action aforenoted occurs relatively rapidly upon adjustment of the throttling valve 108 by the motor 100, to give a well damped speed control to the fuel throttling valve 108.

Speed reset action

A further reset action is effected through operation of the speed reset transformer 77 which includes a rotor 120 having a rotor winding 122 connected through conductors 124 and 126 across the main source of alternating current. The winding 122 is inductively coupled to winding 75 so as to induce a voltage therein which bucks the voltage in the follow-up winding 81. The follow-up droop is removed by a slow-speed reversible electrical reset motor and train assembly 128 which slowly drives the rotor 120 through shaft 123 and in a direction to slowly remove the error between the selected speed and actual speed introduced by the follow-up transformer 83 and thereby provide a slow speed floating reset to wipe out the follow-up signal introduced through the winding 81 of the transformer 83. The rotor 120 is relatively slowly adjusted by the motor 128 which may be of the conventional two-phase type having a winding connected through conductors 130 and 131 across the source of alternating current and a control winding connected by conductors 133 and 134 to the output of an amplifier 135. The reset amplifier 135 may be of conventional type or may be of a type such as shown and described in co-pending application Serial No. 792,885, filed December 20, 1947, by Adolph Warsher.

Controlling the input to the amplifier 135 is a loop circuit including the winding 67 of the speed responsive transformer 61 and the reset selector winding 47 of the selector transformer 37. The winding 47 is inductively coupled to the winding 39 of the transformer 37 and there is induced in the winding 47 a voltage which acts in opposition to the voltage induced in the winding 67 so that a differential or reset signal voltage is induced across input lines 137 and 139 upon the actual speed being above or below that selected through the transformer 37. The latter signal voltage will have a phase relationship dependent upon whether the speed exceeds the selected value thus causing a predominating voltage in the winding 67 of one phase or whether the speed of the engine is below that selected, whereupon a predominating voltage will be induced in the winding 47 in an opposite phase.

Thus, when the speed of the engine exceeds the selected speed, the signal voltage applied by the amplifier 135 to the control winding of the motor 128 will cause rotation slowly of the rotor 120 in a direction to cause the induction in the winding 75 of a reset voltage tending to oppose and wipe out the follow-up voltage induced in the winding 81. The voltage induced by the winding 122 in the winding 75 is opposite in phase to that induced in the winding 81 by the winding 111 so that a follow-up movement of the winding 111 to increase the voltage induced in the winding 81 will be followed by a slow rotation of the rotor 120 and winding 122 to induce in the winding 75 an increasing voltage of opposite phase to tend to wipe out the follow-up voltage induced in the winding 81.

The speed selector circuit is believed to be novel in that it provides a double input voltage, the leg to the reset amplifier 135 being less than that of the main speed amplifier 87 by the amount of the follow-up and reset voltages. Thus, no steady state change in reset magnitude is required by changing throttle position. A further refinement may be introduced by reducing the spread of the selectors slightly to require a small reset change of such magnitude that it exactly equals the amount that the reset runs during a normal transient. As a result, the turbine will arrive at its new steady state dead-on speed. The arrows shown adjacent the several windings 45, 67, 75 and 81; and 67 and 45 indicate diagrammatically the operating relationship of the several windings one to the other.

In order to better understand the latter follow-up and reset action of the present invention, there is shown in Figure 4 a mechanical analogue in which corresponding parts to those previously described with reference to the electrical control system of Figure 2 bear corresponding numerals with the addition of the letter A.

Thus the letter 20A indicates a gas driven turbine the speed of which is to be controlled. The numeral 26A indicates a shaft driven by the turbine 20A and connected to a fly-ball governor 49A to control a floating lever 51A one end of which is pivotally connected at 57A to the fly-ball governor while the opposite end is connected to an adjustable member 1A for setting the regulated speed.

The speed control lever 51A is operatively connected through a link and a differential lever 63A to a hydraulic servo valve 67A to control a hydraulic servo piston type servo motor 100A which controls through a link 106A the position of a valve 108A that controls the flow of a suitable fluid medium to the turbine 20A.

Thus upon the speed of turbine increasing above that for which the regulator is set the fly-balls 49A will cause an adjustment of lever 51A in a counter-clockwise direction about pivot 33A which raises one end of lever 63A and valve 67A to apply hydraulic pressure to the upper side of the piston 100A tending to close valve 108A and decrease the speed of the turbine 20A. The latter downward movement of the piston 100A adjusts one end of a follow-up lever 81A in a counter-clockwise direction so as to lower the other end of lever 63A and tend to return the servo valve 67A to a neutral position.

It should be further noted, however, that the aforenoted counter-clockwise movement of lever 51A will also raise a servo reset valve 47A so as to cause hydraulic pressure to be applied to the lower side of a servo reset piston 128A to be adjusted upward much more slowly than the aforenoted piston 100A. The latter slow upward adjustment of the motor 128A is arranged to raise the other end of the follow-up lever 81A so as to slowly wipe out the aforenoted follow-up action until the lever 51A has been returned to a neutral position on the speed of the turbine returning to the regulated value.

Upon the speed of the turbine decreasing to below the regulated value a similar opposite adjustment of the valve 108A and follow-up and reset action is effected as will be readily apparent. In the conventional proportional plus reset controller, the reset is affected by the follow-up with the result that normal control is considerably delayed (of the order of one minute) after setting a new control speed, while the reset is gradually wiping out the initial follow-up action.

In the subject controller, however, following a new control setting for increasing the speed, the reset speed is brought to zero as soon as the turbine 20A comes up to the new speed setting and the other speed control loop is likewise balanced (except for the reset action in the short initial period), while the valve 108A is being driven to its proper position and the speed signal to its proper value. The reset motor 128A runs then in the opposite direction for another like short interval, however, being at no time feinted out of its central most effective control position from which it floats as required to meet persistent load demands for a turbojet unit which is otherwise already fully compensated for changes in altitude.

By slightly lowering the speed selector sensitivity and accepting a slight steady change of the reset position, "dead-beat" governing may be obtained following the new speed setting.

The aforenoted novel reset mode of operation applies equally to the electrical control of Figure 2 and its mechanical analogue of Figure 4.

Temperature control during acceleration

There is further provided in the subject control of Figure 2 a temperature control effective upon acceleration of the engine to prevent the engine temperature from exceeding a safe value. A thermo couple or temperature probe 30 is positioned in the tail cone or exhaust conduit 28, as shown in Figure 1. The temperature probe 30 may be of a conventional type or of a type such as shown and described in the copending application Serial No. 17,676, filed March 29, 1948, jointly by William R. Polye and William E. Brandau and now U.S. Patent No. 2,483,350, granted September 27, 1949, and assigned to Bendix Aviation Corporation.

As shown in Figure 2, output conductors 140 and 141 lead from the thermocouple 30 to a suitable control winding 143 of a saturable core reactor 145 having a primary winding 147 and a secondary winding 148. The primary winding 147 is connected by conductors 149 and 151 to the main source of alternating current while the secondary winding 148 has output conductors 153 and 154. The amplitude of the voltage induced in secondary winding 148 by winding 147 is a function inversely of the amount of D.C. current fed to the control winding 143 by the thermo couple 30 in response to the temperature at the tail cone 28. Thus, upon an increase in the temperature at the tail cone 28, the D.C. voltage across the input lines 140—141 of the saturating coil 143 increases causing in turn a decrease in the voltage induced in the secondary winding 148 by the primary winding 147, while a decrease in the temperature at the tail cone effects an increase in the induced voltage in secondary winding 148.

The output conductor 153 of the winding 148 has serially connected therein the temperature reset or speed bias winding 69 of the speed transformer 61; a secondary winding or ceiling reference winding 160 of a transformer 162; and temperature follow-up winding 117 of the synchro 83.

The transformer 162 has a primary winding 165 connected across the main source of alternating current through conductors 167 and 169.

The transformer 162 is so arranged that the voltage induced in the secondary winding 160 by winding 165 is 180 degrees out of phase with the voltage induced in winding 148 by the winding 147 and the one opposes the other as indicated diagrammatically by the arrows adjacent the windings 148 and 160 so that when out of balance a differential or signal voltage is applied to the input of an amplifier 171 of conventional type through the lines 153 and 154. The secondary winding 148 of the saturable reactor 145 is so arranged in relation to the ceiling reference winding 160 that at temperatures below a predetermined maximum the voltage induced in the winding 148 will be greater than that of the bucking voltage induced in the reference winding 160. However, upon the temperature exceeding the predetermined maximum, as during acceleration of the turbine 20 to reach a set speed, the D.C. voltage across the control coil 143 will affect the saturable reactor 145 so as to reduce the induced voltage in winding 148 below that of the ceiling reference winding 160 whereupon the phase of the voltage induced in the winding 160 will predominate.

Phase selector

Output lines 173 and 175 lead from the amplifier 171 to a phase selector network indicated generally by the numeral 177 and which is so designed as to permit the passage of a signal voltage to output lines 179 and 181 of a phase corresponding to that induced in the ceiling reference winding 160 and indicative of a tail cone temperature in excess of a permissible maximum, while preventing the passage of a signal voltage of an opposite phase or a phase corresponding to that induced in the winding 148. Thus, a signal voltage calling for more fuel or temperature may be blocked out through action of the phase selector 177, while a signal voltage calling for a decrease in fuel or temperature upon the tail cone temperature being excessive may be passed through output lines 179 and 181 to input lines 91 and 93 of the magnetic amplifier 95. The latter signal voltage to decrease the fuel and temperature of the engine is of sufficient amplitude as to override any signal voltage from the speed responsive amplifier 87 tending to call for opening of the valve 108 to supply more fuel or increase in the speed of the engine.

The phase selector circuit 177 more particularly as shown in Figure 3 includes a pair of phase discriminator tubes 191 and 193. The tube 191 has a cathode 195, grid 196 and plate 197 while the tube 193 has a cathode 201, grid 203 and plate 205.

The grid 196 is connected to input line 175 through a conductor 206 and resistor 207. The grid 203 is connected to input line 173 through a conductor 208. The grids 196 and 203 are shorted upon a positive charge being applied to line 175 through a rectifier 210 one side of which is connected to conductor 206 while the opposite side is connected through a conductor 212 to the line 208. The cathodes 195 and 201 are connected through a resistance 214 to conductor 212.

Connected between the plates 197 and 205 by conductors 216 and 218 respectively is a primary winding 220 of a transformer 222 having a secondary winding 224 from which lead the output lines 179 and 181. A conductor 225 leads from a center tap on the primary winding 220 of transformer 222. A resistor 226 leads from conductor 208 to a line 227 which with line 225 is connected across the main source of alternating current.

It will be seen then that upon a negative charge being applied to line 225 the tubes 191 and 193 will be non-conducting and similarly upon a positive charge being applied to line 175, the rectifier 210 will short out the discriminator tubes 191 and 193 so that a zero potential will be applied to both grids 196 and 203.

However, upon a positive signal charge being applied to line 173 and a negative signal bias to line 175, while a positive charge from the main source of alternating current is applied to line 225 and a negative bias to line 227, the grid 196 will have a negative bias while grid 203 will have a positive charge to decrease the conduction of tube 191 and increase the conduction of tube 193.

Thus, the phase selector will induce into the output lines 179 and 181 through transformer 222 the latter selected signal which is such as to provide a signal voltage calling for the motor 100 to close valve 108 decreasing the fuel supplied the engine and thereby the temperature of the engine.

Temperature follow-up

Rotation of the motor 100 in a direction to close valve 108 causes rotation of the rotor 110 in a direction to increase the voltage induced in the temperature follow-up winding 117 of a phase to buck the predominating voltage of the ceiling reference winding 160 as indicated diagrammatically by the arrows adjacent windings 117 and 160 so as to in effect increase the maximum temperature setting and provide a stabilizing follow-up voltage.

The latter action of closing the valve 108 also causing the rotor 110 to increase the voltage induced in the speed follow-up winding 81 to in effect increase the speed setting and call for more fuel.

Speed bias

It should be borne in mind that excessive rise in the combustion chamber temperature occurs at such time as the control lever 31 is set for increase speed and rapid acceleration of the engine is demanded so that upon the valve 108 in response to the temperature loop circuit tending to close and decrease the fuel supply, the temperature decreases below the limit set by the temperature loop circuit whereupon the speed loop circuit calls for further increase in speed of the engine and a further opening of the valve 108, as previously described.

Further increase in speed of the engine due to the setting of valve 108 causes the fly-ball governor 49 to adjust the rotor winding 63 so as to increase the voltage induced in winding 69 and in a phase opposite to that of the voltage induced in winding 117, so as to in time wipe out the follow-up voltage induced in winding 117 and return the engine temperature to the limited value set by the ceiling reference transformer 162.

It will be seen then that so long as the speed of the engine is below that for which the lever 31 is set and the engine is accelerating, the speed loop tends to call for more fuel and increase in temperature, while the temperature loop is continuously acting to bring the temperature back to the limited temperature value, until such time as the engine speed reaches the preselected value. After the engine speed reaches the selected value the speed loop then effects regulation of the valve 108 so as to prevent the engine speed from exceeding such selected value by continuously throttling the fuel whereupon the engine temperature continuously decreases to well below the permitted maximum until the throttle valve is adjusted to a position or opening at which the preselected speed may be maintained constant.

*Altitude compensation*

As shown in Figure 2, the fuel in conduit 109 is under pressure of a pump 230. A conduict 232 is arranged to return a portion of the fuel from the outlet of the pump 230 to the pump inlet. The latter conduit is controlled by a valve 234 operated by an aneroid 236 in a chamber 238 connected through conduit 6 to the ram air inlet 4.

In a turbojet engine, the mass-rate of airflow into the engine varies directly with the absolute pressure of such air and hence the mass-rate of fuel flow must be kept in proportion to the airflow which is done by making the differential pressure across the fuel valve proportional to absolute pressure of such air through the compensating action effected by valve 234.

Although only one embodiment of the invention has been illustrated and described, various changes in the form and relative arrangements of the parts may be made to suit requirements.

What is claimed is:

1. For use with an aircraft engine having a combustion chamber, and a turbine driven by the exhaust gases from said chamber; the combination comprising adjustably positioned means for controlling supply of fuel to said combustion chamber, means for regulating the position of said fuel control means, a speed responsive device to control said second mentioned means in response to the speed of said turbine and to maintain through said second mentioned means a predetermined turbine speed, follow-up means responsive to a change of position of said fuel control means for affecting said regulating means so as to temporarily inhibit further change of position of said fuel control means, a reset means including a relatively slowly operating means to gradually affect said follow-up means so as to introduce a follow-up offsetting action in direct response to the turbine speed, an element responsive to the temperature of said exhaust gases, selector means operatively connecting said temperature responsive element to said fuel control means upon the temperature of the exhaust gases exceeding a predetermined value so as to override said regulating means and prevent said temperature from exceeding a predetermined maximum.

2. For use with an aircraft engine having a combustion chamber, and a turbine driven by the exhaust gases from said chamber; the combination comprising adjustably positioned means for controlling supply of fuel to said combustion chamber, means for regulating the position of said fuel control means, a speed responsive device to control said second mentioned means in response to the speed of said turbine and to maintain through said second mentioned means a predetermined turbine speed, follow-up means responsive to a change of position of said fuel control means for affecting said regulating means so as to temporarily inhibit further change of position of said fuel control means, a reset means including a relatively slowly operating means to gradually affect said follow-up means so as to introduce a follow-up offsetting action in direct response to the turbine speed, an element responsive to the temperature of said exhaust gases, selector means operatively connecting said temperature responsive element to said fuel control means upon the temperature of the exhaust gases exceeding a predetermined value so as to override said regulating means and prevent said temperature from exceeding a predetermined maximum, and temperature follow-up means responsive to a change of position of said fuel control means for temporarily inhibiting said overriding action.

3. For use with an aircraft engine having a combustion chamber, and a turbine driven by the exhaust gases from said chamber; the combination comprising adjustably positioned means for controlling supply of fuel to said combustion chamber, means for regulating the position of said fuel control means, a speed responsive device to control said second mentioned means in response to the speed of said turbine and to maintain through said second mentioned means a predetermined turbine speed, follow-up means responsive to a change of position of said fuel control means for affecting said regulating means so as to temporarily inhibit further change of position of said fuel control means, a reset means including a relatively slowly operating means to gradually affect said follow-up means so as to introduce a follow-up offsetting action in direct response to the turbine speed, an element responsive to the temperature of said exhaust gases, selector means operatively connecting said temperature responsive element to said fuel control means upon the temperature of the exhaust gases exceeding a predetermined value so as to override said regulating means to prevent said temperature from exceeding a predetermined maximum, temperature follow-up means responsive to a change of position of said fuel control means for temporarily inhibiting said overriding action, and temperature reset means to introduce a temperature follow-up offsetting action in direct response to increase in the turbine speed.

4. A control mechanism for an aircraft engine having a combustion chamber and a turbine driven by the exhaust gases from said chamber, comprising, in combination, valve means for controlling supply of fuel to said combustion chamber, means for regulating the position of said fuel control valve means in response to the speed of said turbine and to maintain a predetermined turbine speed, follow-up means responsive to a change of position of said fuel control valve means for temporarily inhibiting further change, a reset means including a relatively slowly operating means to gradually introduce a follow-up offsetting action in direct response to the turbine speed, a manually operable member for setting the predetermined turbine speed and said reset means, an element responsive to the temperature of said exhaust gases, selector means operatively connecting said temperature responsive element to said fuel control means upon the temperature of the exhaust gases exceeding a predetermined value so as to override said regulating means to prevent said temperature from exceeding a predetermined maximum, temperature follow-up means responsive to a change of position of said fuel control valve means for temporarily inhibiting said overriding action, and temperature reset means to introduce a temperature follow-up offsetting action in direct response to increase in the turbine speed.

5. For use with an aircraft engine having a combustion chamber and a turbine driven by the combustion gases from said chamber; the combination comprising a valve to control the flow of a combustible fuel to said chamber, a reversible electric motor for positioning said valve, a loop circuit for controlling the position of said valve through said motor so as to maintain a predetermined engine speed, said loop circuit including a first variable induction transformer responsive to engine speed, a second variable induction transformer acting in opposition to said first variable induction transformer, manually operable means to adjust said second transformer to select said predetermined engine speed, a follow-up variable induction transformer adjusted by said motor upon changing the position of said valve so as to temporarily inhibit further change in the position of the valve, a reset variable induction transformer in said first mentioned loop circuit, a second reversible electric motor to relatively slowly adjust said reset transformer, a second loop circuit for controlling the adjustment of said reset transformer through said second motor so as to gradually offset said follow-up action, said second loop circuit including said second transformer acting in opposition to said first transformer and adjustable through said manually operable means to set said reset means, a third loop circuit for controlling the position of said valve through said first mentioned motor so as to override said first mentioned loop circuit upon the temperature of the combustion gases exceeding a predetermined maximum value, said third loop circuit including an element responsive to the temperature of said combustion gases, a follow-up variable induction transformer adjustable by said motor to temporarily inhibit said overriding action, and said first transformer to introduce a temperature follow-up offsetting effect in said third loop circuit in response to an increase in engine speed.

6. A control mechanism comprising, means for controlling the speed of an engine including a valve to control flow of fuel to said engine, means for regulating said control means including a motor to position said valve, a circuit for controlling the position of said valve through said motor, said circuit including a variable inductive coupling means providing a signal voltage, means responsive to engine speed operatively connected to said variable inductive coupling means, follow-up means including another variable inductive coupling means drivingly connected to said fuel valve and providing a signal voltage opposing the signal voltage of the first mentioned variable inductive coupling means, and reset means including a variable inductive coupling means positioned in a retarded manner and in response to changes in said engine speed and providing a signal voltage to counteract the signal voltage of the other inductive coupling means of said follow-up means.

7. The combination defined in claim 6 in which the reset means comprises a relatively slowly operating means to gradually adjust the follow-up variable inductive coupling means so as to introduce a follow-up offsetting action in dependence upon the engine speed.

8. The combination set forth in claim 6 in which the reset means comprises a relatively slowly operating motor means to adjust the variable inductive coupling means of the reset means so as to gradually introduce a follow-up offsetting action in dependence upon the engine speed.

9. In an electrical speed control of the automatically rebalancing type for a rotating member, the combination comprising means including a variable inductive device providing an alternating voltage proportional to the speed of the member, means providing an alternating reference voltage having an opposite phase relation to that of said speed voltage and of a selected magnitude, means electrically combining said signal and reference voltages to provide the difference therebetween, an electro-controlled speed adjusting device for the member responsive to the phase relation of the difference voltage for altering the speed of the member in such sense as to reduce the difference voltage to zero, a comparison circuit generating a voltage which varies in accordance with changes in magnitude of an operating parameter of the member other than speed, said comparison circuit being balanced at a predetermined magnitude level of the parameter, means in the output of said circuit for passing only such output voltages as are attributable to unbalance caused by a change in the magnitude of the parameter in a predetermined sense, and circuit means applying said passed output voltages to said speed adjusting device.

10. In a system of speed control for a rotary machine, the combination comprising means including a variable induction transformer providing an alternating speed voltage variable with the machine speed, means providing an alternating reference voltage having an opposite phase relation to that of said speed voltage, means comparing said voltages to derive a signal voltage whose phase relation and magnitude is determined by the sense and magnitude of the difference between said signal and reference voltages, reversible means responsive to said signal difference voltage and actuated in one direction or the other dependent upon its phase relation, means actuated by said reversible means for changing the speed of the machine, a reactor including a temperature sensitive element responsive to temperature of the machine to provide an alternating signal voltage variable with said temperature, means providing another alternating reference voltage having an opposite phase relation to that of said temperature signal voltage, circuit means to compare said temperature signal and said other reference voltages, said temperature signal voltage being balanced by said other reference voltage at a predetermined machine temperature limit, means in the output of said circuit means for passing only those output voltages as are attributable to unbalance caused by machine temperatures in excess of said temperature limit, said passed output voltage having a phase relation such as will effect a reduction in speed of the machine, and means applying said output voltage to said reversible means.

11. In a system of speed control for a jet type engine in which the engine power is delivered rearwardly through an exhaust tail pipe, the combination comprising means including a variable induction transformer providing an alternating speed voltage variable with the engine speed, means providing an alternating reference voltage having an opposite phase relation to that of said speed voltage, means comparing said voltages to derive a signal difference voltage whose phase relation and magnitude is determined by the sense and magnitude of the difference between said signal and reference voltages, reversible means responsive to said signal difference voltage and actuated in one direction or the other depending upon its phase relation, means actuated by said reversible means for changing the speed of the engine, a reactor including a temperature sensitive element responsive to the temperature in the tail pipe to provide an alternating signal voltage variable with the tail pipe temperature, means providing another alternating reference voltage having an opposite phase relation to that of said temperature signal voltage, circuit means to compare said temperature signal and said other reference voltages, said temperature signal voltage being balanced by said other reference voltage at a predetermined temperature limit in the tail pipe, means in the output of said circuit means for passing only such output voltages as are attributable to unbalance caused by tail pipe temperatures in excess of said temperature limit, said passed voltage having a phase relation such as will effect a reduction in speed of the engine, and means applying said output voltage to said reversible means.

12. For use with an aircraft engine having a combustion chamber and a turbine driven by the combustion gases from said chamber; the combination comprising a valve to control the flow of a combustible fuel to said chamber, a reversible motor means for positioning said valve, a loop circuit for controlling the position of said valve through said motor means so as to maintain a predetermined engine speed, said loop circuit including a first variable coupling transformer and a second variable coupling transformer acting in opposition to said first transformer, a speed responsive device to adjust said first transformer in response to the engine speed, manually operable means to adjust said second transformer to select said predetermined engine speed, a follow-up variable coupling transformer in said loop circuit adjusted by said motor means upon changing the position of said valve to provide an electrical signal acting in opposition to the controlling electrical signal in said loop circuit so as to temporarily inhibit further change in the position of the valve, a reset variable coupling transformer in said first mentioned loop circuit, a second reversible motor means to relatively slowly adjust said reset transformer, a second loop circuit for controlling the adjustment of said reset transformer through said second motor means so as to gradually offset said follow-up action, said second loop circuit including said second transformer acting in opposition to said first transformer and adjustable through said manually operable means to set said reset means.

13. For use with an aircraft engine having a combustion chamber and a turbine driven by the combustion gases from said chamber; the combination comprising a valve to control the flow of a combustible fuel to said chamber, a reversible motor means for positioning said valve, a loop circuit for controlling the position of said valve through said motor means so as to maintain a predetermined engine speed, said loop circuit including a first variable coupling transformer and a second variable coupling transformer acting in opposition to said first transformer, a speed responsive device to adjust said first transformer in response to the engine speed, manually operable means to adjust said second transformer to select said predetermined engine speed, a follow-up variable coupling transformer in said loop circuit adjusted by said motor means upon changing the position of said valve to provide an electrical signal acting in opposition to the controlling electrical signal in said loop circuit so as to temporarily inhibit further change in the position of the valve, another loop circuit for controlling the position of said valve through said motor means, said other loop circuit including an element responsive to the temperature of said combustion gases, a selector device to operatively connect said temperature responsive element through said other loop circuit to said motor means only upon the temperature of the combustion gases exceeding a predetermined value so as to override the first mentioned loop circuit and cause said motor means to adjustably position said valve in a fuel decreasing sense, and a follow-up variable coupling transformer adjusted by said motor means to temporarily inhibit said overriding action.

14. A control mechanism comprising an adjustably positioned engine speed control means, an engine speed responsive device, first connecting means operatively connecting said speed responsive device to said speed control means so as to maintain a preselected engine speed, said first connecting means including motor means to adjustably position said control means, follow-up means responsive to a change of position of said control means for affecting said connecting means so as to temporarily inhibit further change of position of said control means, reset means acting in opposition to said follow-up means, another motor means, second connecting means operatively connecting said engine speed responsive device so as to control said other motor means, said other motor means for affecting said reset means so as to counteract the inhibiting effect of said follow-up means, manually operable means, said first connecting means including means operated by said manually operable means for varying the preselected engine speed, and said second connecting means including means simultaneously operated by said manually operable means for varying the control of said other motor means by said engine speed responsive means.

15. A control mechanism comprising an engine fuel control means, an engine speed responsive means, first connecting means operatively connecting said responsive means to said fuel control means so as to maintain a predetermined engine speed, engine temperature responsive means, second connecting means including a selector means for operatively connecting said temperature responsive means to said fuel control means for overriding said speed responsive means upon the engine temperature exceeding a predetermined maximum value, and temperature follow-up means responsive to operation of said fuel control means in a fuel decreasing sense for affecting said second connecting means so as to temporarily inhibit the overriding of said speed responsive means.

16. The combination defined by claim 15 including a temperature reset means controlled by said speed responsive means for affecting said second connecting means so as to override the temperature follow-up means in response to an increase in engine speed.

17. In a mechanism for controlling the operation of a turbo-jet engine having an air intake, a combustion chamber, and a variable speed compressor driven by combustion exhaust gases from said chamber; the combination comprising a fuel control means adapted to control the supply of fuel to the combustion chamber to vary the driven speed of said compressor and temperature of the combustion gases, a speed responsive means adapted to sense the driven speed of said compressor, first connecting means operatively connecting said speed responsive means to said fuel control means so as to maintain the driven speed of said compressor at a predetermined value, temperature responsive means adapted to sense the temperature of the combustion gases of said combustion chamber, second connecting means for operatively connecting said temperature responsive means to said fuel control means for overriding said speed responsive means upon the temperature of said combustion gases exceeding a predetermined maximum value, and a follow-up means responsive to operation of said fuel control means for affecting said second connecting means so as to oppose the overriding of said speed responsive means upon operation of said fuel control means in a speed decreasing sense.

References Cited in the file of this patent

UNITED STATES PATENTS

| | | |
|---|---|---|
| 2,246,686 | Jones | June 24, 1941 |
| 2,285,204 | Hall et al. | June 2, 1942 |
| 2,312,711 | Harrison | Mar. 2, 1943 |
| 2,376,142 | Hoffman | May 15, 1945 |
| 2,376,144 | Levine | May 15, 1945 |
| 2,390,793 | Jones | Dec. 11, 1945 |
| 2,403,371 | Ifield | July 2, 1946 |
| 2,416,097 | Hansen et al. | Feb. 18, 1947 |
| 2,464,629 | Young | Mar. 15, 1949 |
| 2,485,431 | Chudyk | Oct. 18, 1949 |
| 2,489,586 | Ray | Nov. 29, 1949 |
| 2,509,295 | Glass | May 30, 1950 |
| 2,533,042 | Polson | Dec. 5, 1950 |
| 2,662,372 | Offner | Dec. 15, 1953 |